April 16, 1957  J. W. THOMAS  2,789,088
THERMAL DIFFUSION APPARATUS
Filed March 19, 1954
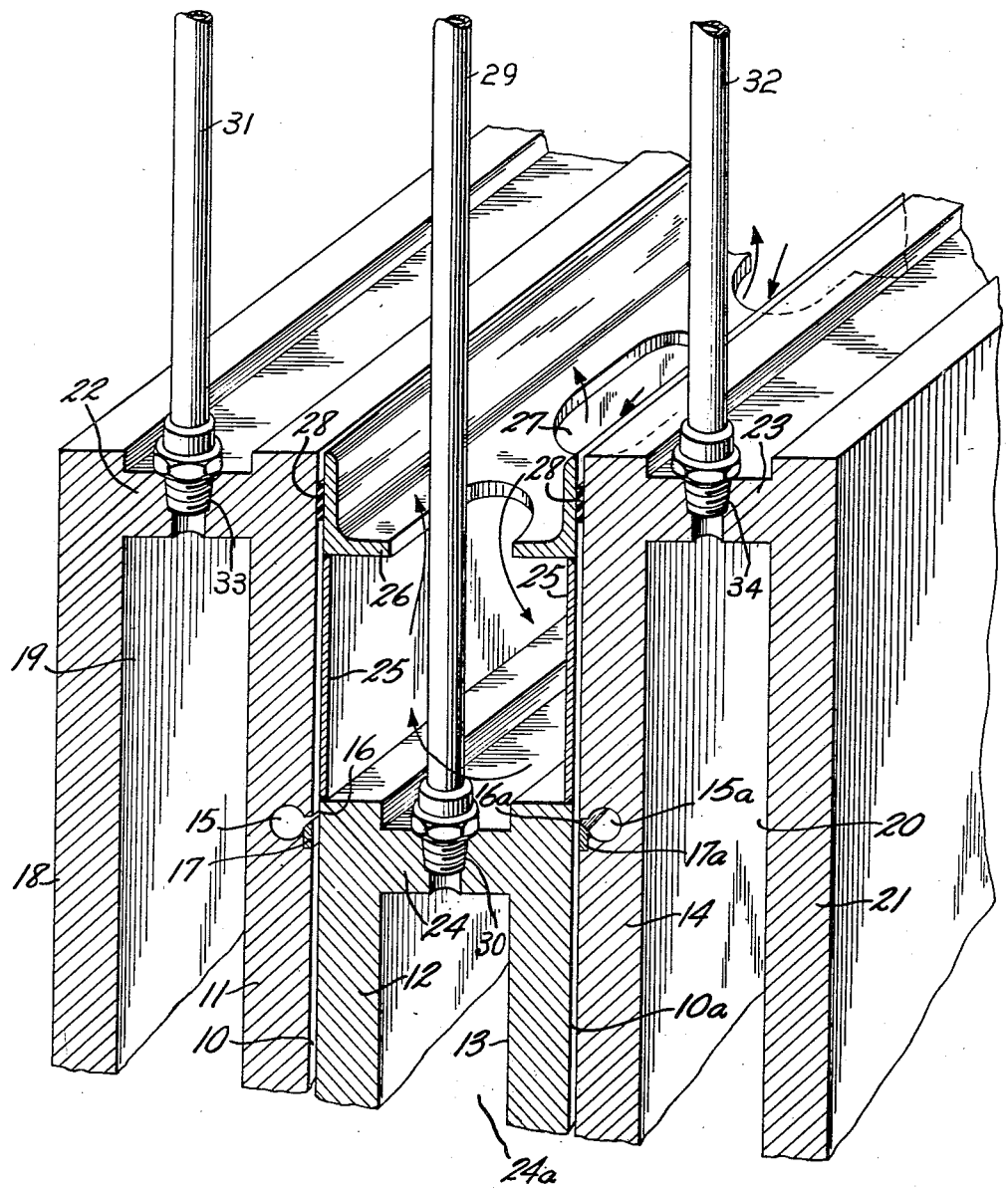
INVENTOR.
JOHN W. THOMAS
BY
*Campbell, Brumbaugh, Free & Graves*
his ATTORNEYS

United States Patent Office 2,789,088
Patented Apr. 16, 1957

2,789,088

THERMAL DIFFUSION APPARATUS

John W. Thomas, Cleveland Heights, Ohio, assignor to The Standard Oil Company, Cleveland, Ohio, a corporation of Ohio Application March 19, 1954, Serial No. 417,363

4 Claims. (Cl. 210—176)

The present invention relates to apparatus for separating liquid mixtures by continuous thermal diffusion and, more particularly, to means in such apparatus for effectively sealing the slit in which the thermal diffusion process takes place.

The separation of liquid mixtures into dissimilar fractions by subjecting a thin film of liquid mixture to a temperature gradient has been long known. For many years this was accomplished in apparatus consisting essentially of two closely spaced parallel walls forming a narrow slit and provided at each end of the slit with a reservoir having a volume considerably in excess of the volume of the slit. By filling such apparatus with a liquid mixture and maintaining the opposed walls at different temperatures, the liquid in one reservoir becomes enriched in one component of the liquid mixture, and the liquid in the other reservoir becomes impoverished in said component or enriched in another component. After many hours or several days, the liquids in the two reservoirs are separately withdrawn. The amount of liquid that can be subjected to thermal diffusion in apparatus of this type is extremely small in comparison to the time and heat energy required so that this technique of separating liquid mixture by thermal diffusion remained nothing more than a laboratory curiosity for some eighty years.

More recently it has been proposed, for example, in United States Letters Patents of A. L. Jones and E. C. Hughes, Nos. 2,541,069, 2,541,070 and 2,541,071, to subject liquid mixtures to thermal diffusion by maintaining a temperature gradient across a narrow slit formed between closely spaced concentric or flat walls, and continuously introducing a stream of the liquid mixture into the slit. It was found that by such means the rate of separation obtainable was much improved in that the separated components could be continuously discharged at opposite ends of the slit. The advantages of this continuous process, particularly its application to petroleum products, are evident, and the inherent simplicity of the apparatus permits it to be in use for long periods without interruption.

In the separation of certain liquid mixtures by the thermal diffusion process, it is sometimes necessary or desirable to maintain a high temperature gradient across the slit, and the necessary high temperature of the hot wall presents a difficulty in effectively sealing the periphery of the slit. Metal or metal-jacketed gaskets cannot be used because of their high heat conductivity, and non-metallic gaskets deteriorate at high temperatures. Heretofore, the sealing gasket has been interposed in the slit between and in direct contact with the hot and cold walls, and although the temperatures employed in the thermal diffusion process vary depending upon the product being separated, the optimum temperatures of the hot wall for some petroleum products occasionally should exceed 500° F. Very few gasket materials can withstand temperatures of this order. For example, Silastic, which is an excellent gasket material, cannot be used when the temperature of the hot wall exceeds 500° F.

The present invention is directed to a modified construction for thermal diffusion apparatus wherein the thermal diffusion slit can be effectively sealed by conventional sealing materials even though the temperature of the hot wall is at a level which exceeds the temperature at which the sealing material would normally break down or deteriorate.

In accordance with the construction of the present invention, the periphery of the slit in the vicinity of the sealing gasket is formed by the cold wall and an extension to the hot wall which is out of contact with the heating medium. This extension of the thermal diffusion slit makes it possible to locate a gasket for sealing the slit remotely from the hot wall. The extension to the hot wall is preferably made of a thin gauge metal to reduce the thermal conductivity between the hot wall and the sealing gasket, and the surface of the extension opposite to the side forming the thermal diffusion slit is in contact with the atmosphere or other circulating fluid for dissipating the heat therefrom.

More particularly, the side of the thin metal extension opposite the thermal diffusion slit defines one wall of an open-ended chamber, and an apertured cover is placed across said open end of the chamber to reinforce the thin extension wall at the end opposite the hot wall. The aperture or apertures in the cover permits the dissipation of heat from the chamber and makes it possible to introduce a coolant into the chamber.

The temperature of the extended wall may, thus, be maintained at a much lower temperature than the hot wall, and if it is desirable or necessary in certain instances to maintain a very high order of hot wall temperature, a forced circulating fluid may be employed to keep the temperature of the extended wall below that at which sealing material will begin to break down or deteriorate.

The advantages and details of the present invention will be more readily understood by reference to the following description and to the accompanying drawing wherein The figure is a cross-sectional isometric view of a parallel plate thermal diffusion unit equipped with the present invention.

The present invention is shown in the drawing as being applicable to a parallel-plate type thermal diffusion unit, although it should be understood that the invention has general application to thermal diffusion apparatus of many different types as well.

The liquid product is introduced through suitable inlet ports (not shown) into the narrow slits 10, 10a, the slit 10 being formed between parallel walls 11, 12, and the slit 10a being formed between parallel walls 13, 14. The slits 10, 10a each have a discharge port in the vicinity of the upper and lower ends of the slit. In the drawing only the upper ends of the slits 10, 10a with their upper discharge ports 15, 15a, respectively, are shown, but it may be assumed that the lower ends thereof are similar in all respects. The upper discharge port 15 for the slit 10 is a horizontal boring formed in the wall 11, and the boring communicates with the slit 10 by means of a narrow elongated opening 16 formed in part by a knife-edge bar 17; in like fashion, the discharge port 15a for the slit 10a is a horizontal boring formed in the wall 14, and the horizontal boring 15a communicates with the upper end of the slit 10a by means of an elongated opening 16a similarly formed in part by a knife-edge bar or strip 17a.

The walls 12 and 13 represent the "hot" walls for the slits 10, 10a, respectively, and may be heated by any suitable means such as the passage of a hot fluid therebetween. For example, the hot fluid may be introduced into the chamber between the walls 12 and 13 by means of the conduit 29 which is connected to the pipe tap 30. Similar means (not shown) are provided at the opposite end of the chamber for the exit of the hot fluid. The outer walls, 11, 14 are the "cold" walls, and may be cooled by any suitable means such as the passage of a cold fluid in contact therewith. Accordingly, a chamber 19 is formed adjacent the cold wall 11 by spacing an outer wall 18 in parallel relation with the wall 11 and likewise, a chamber 20 adjacent the wall 14 is formed by spacing an outer wall 21 in parallel relation with the wall 14. The chamber 19 may be suitably enclosed by end walls 22 connecting the edges of the walls 11, 18 to form a fully enclosed chamber, and end walls 23 extending between the edges of the walls 14 and 21 may also be provided to fully enclose the chamber 20. The cold fluid may be introduced into the chambers 19 and 20 by means of the conduits 31 and 32 which are connected to pipe taps 33 and 34, respectively. Similar means (not shown) are provided for the exit of the cold fluid at the opposite end of the chambers 19 and 20. Similarly, a chamber 24a for a heating medium, such as Dowtherm, may be formed between the edges of the walls 12 and 13 by the end walls 24.

Obviously the outer walls 18, 21 may serve as the cold walls for further thermal diffusion slits located outboard of each of said walls, and the number of parallel slits may be greatly multiplied by building them up in this fashion.

The chambers 19, 20 may be provided with inlet and outlet ports (not shown) for the circulation of the cooling medium therethrough, and also the chamber 24a formed between the hot walls 12, 13 may contain inlet and outlet ports for the circulation of the heating medium.

The resultant temperature gradient across the slits 10, 10a causes thermal diffusion to take place in the liquid within the slit so that one component of the fluid becomes more concentrated in the vicinity immediately adjacent the hot wall and tends to rise by convection currents whereas the other component of the fluid accumulates immediately adjacent the cold wall and, accordingly, tends to fall. The action which takes place in both slits 10, 10a is the same. Thus, the component which tends to rise within the slits 10, 10a may be discharged through the discharge openings 16, 16a into the discharge ports 15, 15a, and the component which tends to fall may be discharged through similar ports formed in the vicinity of the lower ends of the slits.

As shown in the drawing, the hot walls 12, 13 do not extend the entire length of the cold walls, and the edges of the hot walls 12, 13 are provided with extension walls 25 which define a long channel between them. Also, although not shown in the drawing, the hot walls 12, 13 may not extend the entire breadth of the cold walls, so that the vertical edges of the hot walls 12, 13 also are provided with extension walls. The extension walls may be made of various materials, such as materials of low thermal conductivity, however, in the preferred embodiment of the invention it is preferred that the extending walls be of light gauge sheet metal material so that they may be easily joined, e. g., by welding, at their lower ends to the hot walls. The low cross-section area of the very thin sheet metal prevents it from being a good conductor of heat while affording a high rate of heat loss from the surfaces thereof. A U-shaped reinforcement member 26 is mounted above and between the upper ends of the extension walls and serves to reinforce the latter. This reinforcement member is formed with a plurality of perforations 27 therein to provide access for the free circulation of air into and out of the channel between the extension walls 25. In this manner, heat may be readily dissipated from the surfaces thereof opposite the slits by convection air currents.

Referring to the drawing, it will be observed that the extreme upper ends of the slits 10, 10a above the hot walls are defined by the extending walls 25 and the outside flat surfaces of the reinforcement member 26. Gaskets 28 for sealing the ends of the slits 10, 10a are inserted between the cold wall and the outside surfaces of the reinforcement member. Of course, if preferred, the upper ends of the walls 25 may be extended so that the outer side surfaces of the reinforcement member 26 abut the inside faces of the walls, in which case the gaskets 28 would be in direct contact with the walls 25. Although these gaskets may be made of any suitable material, it has been found, as mentioned above, that Silastic gaskets are very satisfactory provided that the temperature of the surfaces of the reinforcement member which they engage does not exceed 500° F. If the liquid mixture to be thermally diffused is a petroleum product, it may be preferable to provide Silastic gaskets with a protective covering, such as Teflon.

In this arrangement, the gaskets are remotely located from the hot wall, so that the hot wall may be maintained at temperatures considerably above the maximum temperature which the gasket material is capable of withstanding without the danger of deterioration thereof. The low cross-sectional area of the walls 25 make them poor conductors of heat. Furthermore, the removal of heat from the walls 25 is greatly facilitated by the large surfaces thereof, the one surface being so closely spaced to the cold wall of the thermal diffusion slit and the other surface being accessible to the air convection currents. In addition, the heat may be more rapidly dissipated from the walls 25 by forced circulation of cool air or fluids into the channel formed therebetween.

In the drawing, the discharged ports 15, 15a are shown as being located in the temperature gradient region between the hot and cold walls, however, if preferred, the discharge ports may be situated at the extreme ends of the slits, such as directly below the gaskets and opposite the extension walls 25.

The present invention has been shown in a single preferred form and by way of example only, and obviously many modifications and variations may be made therein which are within the spirit of the invention. It is to be understood, therefore, that the invention is not to be limited to any specified form or embodiment except insofar as expressly limited in the claims.

I claim:

1. Liquid thermal diffusion apparatus for seperating dissimilar fractions of a liquid mixture comprising a pair of substantially parallel inner walls, a pair of substantially parallel outer walls, each of the outer walls being spacially separated from its respective inner wall to form between them a narrow slit for the reception of the liquid mixture, means for maintaining the inner walls at higher temperatures than the outer walls to produce a temperature gradient across each of the two slits, an end wall between the inner walls enclosing the means for maintaining the inner walls at higher temperatures than the outer walls, each of the outer walls extending at one end beyond the inner walls, said inner walls having extensions which are spacially separated from the extended portions of the outer walls, forming with the outer walls extensions of the thermal diffusion slits beyond the means for maintaining the inner walls at higher temperatures, sealing means accommodated in the spaces formed between the outer walls and the extensions of the inner walls to make the thermal diffusion slits liquid-tight, said extensions permitting the sealing means to be located remotely from the inner hot walls, and an open chamber formed between the inner wall extensions and beyond the said end wall to permit the dissipation of heat from the surfaces of said extensions opposite the surfaces forming the slits.

2. The apparatus defined in claim 1 including reinforcement means extending between the said inner wall extensions.

3. Liquid thermal diffusion apparatus for separating dissimilar fractions of a liquid mixture comprising a pair of substantially parallel inner walls, a pair of substantially parallel outer walls, each of the outer walls being spacially separated from its respective inner wall to form between them a narrow thermal diffusion slit for the reception of the liquid mixture, means for maintaining the inner walls at higher temperatures than the outer walls to produce a temperature gradient across each of the two slits, each of the outer walls extending at one end beyond the inner walls, an end wall between the inner walls, said inner walls having extensions of thin gauge metal which are spacially separated from the extended portions of the outer walls, said thin gauge metal extensions forming with the outer walls extensions of the slits beyond the means for maintaining the inner walls at higher temperatures, an open-ended chamber formed between the inner wall extensions and beyond the end wall to permit the dissipation of heat from the surfaces of the extensions, a perforated reinforcement channel member extending between the inner wall extensions at the open end of the chamber, the perforations in the channel member permitting the dissipation of heat from the chamber, and sealing means to make the thermal diffusion slits liquid-tight, said sealing means being interposed in said slits beyond the inner hot walls.

4. Liquid thermal diffusion apparatus for separating dissimilar fractions of a liquid mixture comprising two closely spaced walls forming a narrow thermal diffusion slit between them for the reception of a liquid mixture, one of said walls being accessible to a heating medium and being thereby maintained at a higher temperature than the other to produce a temperature gradient across the thermal diffusion slit, and end wall connected to said hotter wall for enclosing the heating medium, at least one edge of the cooler wall extending beyond the corresponding edge of the hotter wall, an extension to said hotter wall closely spaced in relation to the cooler wall and continuing the thermal diffusion slit beyond the portion of the hotter wall which is accessible to the heating medium, a seal for maintaining the thermal diffusion slit liquid tight, said extension wall permitting the seal to be located remotely from the hotter wall, an open-ended chamber formed at least in part by said end wall and said extension to the hotter wall to permit the dissipation of heat from the surface of the extension opposite the surface forming the slit, said liquid thermal diffusion apparatus including a reinforcing cover for the open end of the chamber, and perforated means in the cover to permit the dissipation of heat from the chamber.

References Cited in the file of this patent
UNITED STATES PATENTS

| | | |
|---|---|---|
| 2,424,179 | McNitt | July 15, 1947 |
| 2,541,069 | Jones et. al. | Feb. 13, 1951 |
| 2,541,071 | Jones et. al. | Feb. 13, 1951 |
| 2,567,765 | Debye | Sept. 11, 1951 |
| 2,585,244 | Hanson | Feb. 12, 1952 |